United States Patent [19]

Vicenzi et al.

[11] Patent Number: 5,224,990
[45] Date of Patent: Jul. 6, 1993

[54] SURFACTANT-MODIFIED BITUMINOUS EMULSIONS

[75] Inventors: Stephen Vicenzi, Edgerton, Wis.; Ken F. Gryzbowski, Temple Terrace, Fla.

[73] Assignee: Exxon Chemical Patents Inc., Linden, N.J.

[21] Appl. No.: 898,159

[22] Filed: Jun. 15, 1992

Related U.S. Application Data

[63] Continuation of Ser. No. 595,202, Oct. 10, 1990, abandoned.

[51] Int. Cl.$^5$ .............................................. C08L 95/00
[52] U.S. Cl. ................................. 106/277; 106/284.3
[58] Field of Search ........................... 106/284.02, 277

[56] References Cited

U.S. PATENT DOCUMENTS

| | | | |
|---|---|---|---|
| 4,447,269 | 5/1984 | Schreuders et al. | 106/277 |
| 4,462,840 | 7/1984 | Schilling et al. | 106/277 |
| 4,464,285 | 8/1984 | Schilling | 106/277 |
| 4,464,286 | 8/1984 | Schilling | 106/277 |
| 4,895,600 | 1/1990 | Chang et al. | 106/284.1 |

OTHER PUBLICATIONS

Abraham, *Asphalts and Allied Substances*, Van Nostrand Co., Inc. New York, 1945, pp. 543-551.

Primary Examiner—David Brunsman
Attorney, Agent, or Firm—Jansson & Shupe

[57] ABSTRACT

An improved clay-stabilized bituminous emulsion surface-coating composition and method of preparation therefore, including an aqueous bituminous emulsion and a surfactant selected from the group consisting of neutral polyamines, partially and fully acid-neutralized polyamine salts, and mixtures thereof having the structural formula

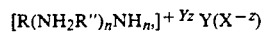

$$[R(NH_2R'')_n NH_{n'}]^{+Yz} Y(X^{-z})$$

wherein R is a lipophile selected from the group consisting of

R'C(O)—, (acyl),
R'—, (alkyl), and
R'OR''—(alkoxyalkyl),

R' is an alkyl chain having 3-26 carbon atoms, R" is a hydrocarbon fragment having from 2-6 carbon atoms, n is an integer from 0-4, n' is an integer from 2-3, z is an integer from 0-5 corresponding to the degree of surfactant neutralization and positive charge, X is an anion selected from the group consisting of fully- or partially-unprotonated mono- or polyacids, and Y is an integer from 0-5 corresponding to the number of anions having a negative z charge. Such surfactant is present in an amount sufficient to provide an emulsion with stable gel structure and may be post-added to the bituminous emulsion with a minimum of stirring, immediately before application, if necessary.

26 Claims, No Drawings

SURFACTANT-MODIFIED BITUMINOUS EMULSIONS

This is a continuation of application Ser. No. 595,202, filed Oct. 10, 1990. now abandoned.

FIELD OF THE INVENTION

This invention is related generally to bituminous emulsions for industrial coatings, pavement sealers and the like, and, more particularly, to asphalt and coal tar emulsions of the type stabilized with clay.

BACKGROUND OF THE INVENTION

For many years various clays have been used in combination with both petroleum- and coal tar-derived bitumens to form aqueous emulsions. These so-called "colloidal clays" have many of the chemical and physical properties necessary to suspend the bitumen in the aqueous phase, providing the emulsion the consistency and stability desired.

Colloidal clay-stabilized emulsions do, however, have a tendency to phase-separate: the bitumen and clay particles (the discontinuous phase) settle over time, becoming a dense mass. Reblending into a homogeneous colloidal emulsion is often difficult and time-consuming. Phase-separation is especially troublesome and costly when extensive reblending is required just prior to application. The consequences of applying a phase-separated emulsion are even more undesirable and include: inadequate coverage rates, disabled spray equipment, non-uniform curing rates, varying cured-coating performance properties, and discolored and unsightly coating appearances, to mention but a few.

Early concern over phase separation and the problems associated with it fostered the use of water-soluble gums, including cellulose ethers, which retard phase separation by absorbing water from the aqueous phase and increasing emulsion viscosity. Essentially, the water is thickened to the extent that the modified fluid properties physically slow the settling of bitumen and clay particles.

Cellulose ethers, for example, are typically pre-mixed in a portion of the aqueous phase, which is later incorporated into the emulsion before application. As a whole, this approach is relatively inexpensive and alleviates many of the aforementioned concerns.

However, the prior art has associated with it a number of significant problems and deficiencies. Most are related to inadequate emulsion performance and phase-separation, and result from the emulsion thickeners currently used.

A number of significant problems stem from the fact that thickeners of the prior art are typically dry powders, which undergo immediate hydration upon contact with water. These gums tend to agglomerate and build localized viscosities which inhibit homogeneous dispersion. Because each gum particle must be hydrated, the final emulsion viscosity may be obtained only with days of continuous stirring. If a homogeneous blend is not obtained unhydrated gum may be applied with the emulsion. Because gums retain their hygroscopic effects once in the emulsion, contact with moisture after application invariably results in an uptake of water, re-emulsification, and a total breakdown of the cured film.

A related problem is overdosage. Because final emulsion viscosity lags so far behind the addition of thickener a concern is a tendency to add too much. A slight excess may produce an emulsion too thick and entirely unacceptable for a given application.

To overcome these and other problems, the particles of many gum-type thickeners of the prior art are chemically encapsulated during manufacture and pre-dispersed in a relatively small portion of the aqueous phase during the initial part of the preparation. The resulting slurry is added to a dispersion of clay and bitumen. De-encapsulation is accomplished by treatment with base, at which point viscosity develops rapidly.

This attempt to solve one problem creates several others. If a gum concentration is too high attempts to adjust the pH may lead to excessively high viscosities, so much so that the emulsion cannot be pumped or poured.

Considerable care and diligence is required in adding the base. A high, localized concentration will cause what is commonly referred to as "pH-shock". An overadjustment of the pH will disrupt the pH balance of the emulsion, resulting in an increased potential for later phase separation and curing problems. The same concerns follow use of a concentrated, rather than dilute, base solution.

Either under- or overdosage may lead to re-emulsification problems later. A base of insufficient strength will not completely de-encapsulate the gum, leaving the potential for further hydration after application. Overdosage with a stronger base such as a metal hydroxide, may lead to cationic interference with the clay surface. Later contact of the cured emulsion with water will initiate re-emulsification and destroy the film.

Several significant problems associated with thickeners of the prior art relate to the fact they are dry powders. Airborne particulates present the potential for respiratory problems among those so employed. The dust itself is highly explosive, given a source of ignition. As such, thickeners of the prior art have long been a concern to regulatory bodies such as the Federal Occupational Safety and Health Administration and the Environmental Protection Agency, as well as their state and local counterparts.

Production techniques and short-comings aside, phase separation is still a major problem of the prior art. Emulsion compositions prepared with such thickeners are unstable over time. Bitumen and clay settle during storage and transportation. Considerable mixing is required immediately prior to application, with the added expense of time and money.

Another major problem of the prior art is that emulsion compositions prepared with such thickeners tend to be non-thixotropic; that is to say, not shear-acceptable. Emulsions prepared in this way do not spread uniformly without interruption upon application of a shearing force and typically do not exhibit many other properties desired with surface coatings of this sort.

Another significant problem of the prior art is film performance. The non-uniform dispersion and non-homogeneity described above cause cured emulsion films of the prior art to have an uneven appearance, rather than the highly desired uniform dark black color. A related concern is decreased water resistance. The presence of unhydrated thickener will cause re-emulsification of the film upon contact with water.

Another significant problem is the required addition of biocides. Cellulose thickeners are, for the most part, vegetable matter. For example, cellulose gums are derived from various sources, including wood pulp and cotton. These materials support fungal and bacterial life, the bi-products of which are weakly acidic and may later "sour" the emulsion causing phase separation. As a preventative measure, synthetic biocides must be added during emulsion formulation and represent an extra production cost.

The overall cost of thickeners of the prior art is another major concern. Typically, bituminous emulsions produced for outdoor use are 0.5-2% by weight of a cellulose gum or latex, a relatively high concentration of a relatively expensive material. Furthermore, if higher concentrations of bitumen and clay are desired in the emulsion more thickener is needed to maintain the desired degree of suspension and viscosity. The real cost of the thickener is greatly increased when the pH-adjustment chemicals and biocides are considered.

In summary, a considerable number of drawbacks and problems exist in the art relating to clay-stabilized bituminous emulsions. There is a need for an improved emulsion composition.

OBJECTS OF THE INVENTION

It is an object of this invention to provide an improved clay-stabilized bitumen emulsion composition, overcoming some of the problems and shortcomings of the prior art.

Another object of this invention is to provide an improved thickener ingredient for clay-stabilized bituminous emulsions.

Another object of this invention is to provide an improved method for preparation of clay-stabilized bituminous emulsions such that the thickener is subsequently added to and dispersed within a pre-formed bitumen and clay emulsion immediately prior to application if necessary.

Another object of this invention is to provide an emulsion composition wherein the thickener is usable in some form other than a dry powder.

Another object of this invention is to provide a thickener which does not agglomerate, causing localized excessive viscosities and non-uniform dispersion, causing later re-emulsification.

Another object of this invention is to obtain final emulsion viscosity immediately after addition of the thickener, without the need for excessive stirring or blending. Another object of this invention is to provide an emulsion composition wherein the thickener does not create the potential for hygroscopic activity and re-emulsification after emulsion application.

Another object of this invention is to provide an emulsion composition wherein the thickener does not cause excessive viscosity if added in excess.

Another object of this invention is to provide an emulsion composition wherein the thickener does not require encapsulation to prevent agglomeration and other related concerns.

Another object of this invention is to provide an emulsion composition wherein the thickener obviates the need for pre-dispersion within the aqueous phase.

Another object of this invention is to provide an emulsion composition wherein the use of the thickener does not require a pH-adjustment to initiate and control viscosity development.

Another object of this invention is to provide an emulsion composition wherein the thickener does not lead to re-emulsification and other related problems after application because of over- or under pH-adjustment.

Another object of this invention is to provide an emulsion composition wherein the thickener does not pH-shock the emulsion, causing later instability and curing problems.

Another object of this invention is to provide an emulsion composition wherein the thickener produces a thixotropic emulsion, one which is shear-susceptible, stable, and does not phase-separate.

Another object of this invention is to provide an emulsion composition wherein the thickener does not have the potential to cause respiratory problems for those working with it.

Another object of this invention is to provide an emulsion composition wherein the thickener is not an explosion hazard. Another object of this invention is to provide a bituminous emulsion composition which maintains excellent water-resistance after application.

Another object of this invention is to provide a bituminous emulsion composition which cures with a highly desired uniform, dark black appearance.

Another object of this invention is to provide an emulsion composition wherein the thickener does not require the addition of biocides to prevent phase separation.

Another object of this invention is to provide an emulsion composition wherein the thickener is cost-effective and one which may be used at low concentrations even with low levels of bitumen and clay.

These and other important objects will be apparent from the descriptions of this invention which follow.

SUMMARY OF THE INVENTION

This invention is an improved clay-stabilized bituminous emulsion composition and method for producing such a composition for use as a surface coating and the like. This invention overcomes certain well-known problems and deficiencies, including those outlined above.

An important aspect of this invention is an improved emulsion-stabilizing thickener, including a preferred alkoxypropyldiamine diacetate salt surfactant. The inventive composition and method allow addition of the thickener to an aqueous emulsion of clay and bitumen to give a homogeneous, stabilized emulsion with the desired viscosity and stability without significant additional mixing. Such post-addition results in greater efficiency and lower production costs. The thickener of this invention keeps bitumen and clay in suspension, reducing or eliminating altogether the need for mixing prior to application.

In part, this invention is a clay-stabilized bituminous emulsion surface-coating composition including (1) about 90.0-99.9 parts by weight of an aqueous bituminous emulsion, and (2) about 0.1-10.0 parts by weight of an emulsion-stabilizing surfactant selected from the group consisting of neutral polyamines, partially- and fully- acid neutralized polyamine salts, and mixtures thereof having the structural formula

wherein R is a lipophile selected from the group consisting of

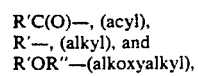

R' is an alkyl chain having 3-26 carbon atoms, R" is a hydrocarbon fragment having 2-6 carbon atoms, n is an integer from 0-4, n' is an integer from 2-3, z is an integer from 0-5 corresponding to the charge and degree of surfactant neutralization, X is an anion selected from the group consisting of fully- or partially-unprotonated mono- or polyacids and Y is an integer from 0-5 corresponding to the number of anions having a negative z charge. As a result the bitumen and emulsifying clay are maintained in stable and homogeneous emulsion through application. The clay is present in an amount sufficient to emulsify the bitumen, and the surfactant is present in an amount sufficient to provide the emulsion a stable gel structure. (For the purpose of this discussion and consistent with accepted chemical nomenclature, the term "partial"- in the context of acid-base neutralization-refers to addition of less than a stoichiometric amount of acid to a base. In the same context, "full" neutralization refers to addition of a stoichiometric amount of acid to a base. Likewise, with respect to a polyacid, the same relationship applies.)

In preferred embodiments, the lipophile, R, is alkoxyalkyl. Therein, R' has from 3-21 carbon atoms. In highly preferred embodiments, the R' portion of the alkoxyalkyl lipophile has from 10-13 carbon atoms in a highly-branched configuration. The most preferred embodiment is where R' equals 10 carbon atoms, X is the acetate anion and the surfactant is decoxypropylaminopropylamine diacetate, in which R' has a highly-branched configuration.

The bitumen component of the emulsion composition may be selected from the group consisting of coal tar and asphalt. Colloidal clay is selected from the group consisting of bentonite, ball, and kaolin clays. In addition, any one of these three clays may be combined with attapulgite clay.

In preferred embodiments, the ratio of bitumen to clay is at least 1:1. Overall, preferred embodiments are 20-60 parts by weight bitumen and clay and 40-80 parts water. In highly preferred embodiments, the bituminous emulsion is 25-55 parts by weight bitumen and colloidal clay and 45-75 parts water.

Completing the emulsion composition of this invention, preferred embodiments include 0.10-3.20 parts by weight surfactant. Filler may be added to the composition to provide bulk.

The method of this invention begins with a preformed aqueous emulsion of clay and a bitumen selected from the group consisting of coal tar and asphalt. Subsequently, about 0.1-10.0 parts by weight of the surfactant is added to about 90.0-99.9 parts by weight of the preformed emulsion and dispersed therein.

As with the composition, the method of this invention utilizes a surfactant selected from the group consisting of neutral polyamines, partially- and fully-neutralized polyamine salts, and mixtures thereof having the structural formula wherein each variable is defined as above, and the surfactant is present in an amount sufficient to provide stable gel structure. The preferred and highly preferred embodiments of this method include surfactants identical to those within the preferred and highly preferred compositions of this invention. Likewise, the preferred amount of surfactant used with the method of this invention is that preferred in the composition of this invention.

As previously noted, clay-stabilized bituminous emulsion compositions and methods for producing them, as revealed through this invention, have certain advantages, most of which relate directly to the use of a polyamine surfactant. Used as liquids, surfactant thickeners of this invention are easily added to pre-blended bituminous emulsions, with a minimum of stirring. Post-addition is possible, adding the polyamine directly to the bituminous emulsion, just prior to application, if necessary. As liquids, these surfactants are dispersed uniformly and rapidly throughout the emulsion medium. The final, stable viscosity is achieved quickly, without the risk of over- or under-dosage, or the need for a complicated, time-consuming de-encapsulation procedure which may lead to later instability and curing problems. There attributes promote efficiency and represent a cost-savings over the preparation of emulsions of the prior art which utilize cellulose thickeners or latex gums.

Because the polyamine surfactant is dispersed easily and homogeneously, the resultant cured film exhibits a desired uniform dark black appearance. Without the risk of agglomeration and retention of hygroscopic activity, common with use of thickeners of the prior art, films produced from emulsion compositions of this invention do not re-emulsify, but have excellent water-resistance, a property required of outdoor surface coatings exposed to heavy or reoccurring moisture conditions.

The emulsions prepared as described herein may be described as psuedoplastic, as evidenced by the gel strength of the compositions, the relatively high viscosities at low shear rates, the relatively low viscosities at high shear rates, good uniformity and viscosity reduction in response to a uniform shear force applied over time, and good recoverability, that is, recovery of initial properties after removal of the shear force.

Gel strength stabilizes the emulsion composition, preventing clay and bitumen from settling over long periods such as those commonly encountered during storage and transportation. High viscosity at low shear rates insures emulsion uniformity during processing, packaging, and application. Low viscosity at high shear rates allows for easier and more cost-efficient application. Good viscosity recovery minimizes cavity formation and post-application flow during aqueous evaporation, as well as coalescence of clay and bitumen particulates.

As liquids, the surfactant thickeners of this invention may be used without the respiratory concerns associated with the dry powders of the prior art. Neither polyamines or their salts, including the preferred diamine diacetates, are regulated as flammable or explosive by state or federal regulatory agencies. The health and safety concerns inherent with the prior art are relieved and altogether avoided.

The polyamine surfactants, including the most preferred diamine diacetates, are synthetic reagents which do not support the growth and proliferation of bacteria or fungi, as do cellulose and latex additives of the prior art. As such, biocides need not be added to the final emulsion product to protect the integrity and stability of an applied coating. Inasmuch as biocides of this sort are relatively expensive, deleting them affords a considerable cost-savings when compared to the prior art.

As discussed above, the surfactants of this invention are distinguished, in part, by the presence of a polyamine functionality, fully- or partially-neutralized in preferred embodiments. The sequence of a given mono-, di-, tri-, tetra-, and pentaamine is associated with a roughly linear increase in gel stability and viscosity, two highly-desirable characteristics of a bituminous emulsion. It is believed the observed trend is due primarily to a concomitant increase in surface activity and number of hydrophilic sites. The correlation is even more pronounced with a given sequence of polyamine salts. The diamine salt is preferred for reasons of viscosity control and ease of formulation.

The number of hydrophilic sites are determined by the degree of polyamine neutralization with any one of a wide range of mono- or polyacids. For instance, a diamine or triamine may be fully- or partially-neutralized to provide variation in gel and viscosity properties depending upon application requirements. The fully-neutralized diamine diacetates are preferred and most closely meet the aforementioned objectives.

With regard to neutralization, either organic or inorganic acids may be utilized to derive the preferred polyamine salts. Formic, acetic, citric and propanoic are included among the organic acids found useful. Sulfuric, nitric, phosphoric, and the hologynic acids are typical of the inorganic varieties successfully employed. Acetic acid is highly preferred, in that it is economical, easy to formulate, and when used to neutralize a polyamine provides an emulsion composition with excellent gel and viscosity characteristics.

The lipophilic portion of the polyamine thickener may be derived and originate from any one of a number of fatty precursors. Surfactants having an alkoxyalkyl lipophile with a 3–26 carbon R' portion provide excellent results when used to stabilize emulsions of the type discussed herein. The preferred alkoxyalkyl lipophile are those with an R' portion having a range of 3–21 carbon atoms, in any structural configuration including linear, branched, highly-branched, or cyclic. Polyamines in which R' is above or below this range produce emulsions with less than optimal viscosity and gel characteristics.

The most preferred alkoxyalkyl lipophile are those in which R' has 10–13 carbon atoms in a highly-branched configuration. Polyamines which include such a structural feature provide excellent viscosity. Below the lower end of the preferred R' range (10) viscosity, efficiency, and gel stability for a given polyamine decrease and a higher surfactant concentration may be needed to provide the desired emulsion characteristics. Beyond the higher end (13), surfactants of this type tend to solidify, introducing various formulation difficulties and performance deficiencies.

The structural configuration of R' influences surfactant performance. While all such configurations of a given R' work well when incorporated into a polyamine, those with highly-branched configurations exhibit the greatest improvement in emulsion viscosity and gel stability over thickeners of the prior art. Generally, the presence of a highly-branched alkyl chain within a chemical system imparts to it a degree of liquidity not possible with the linear counterpart. This phenomenon is also observed in emulsion compositions of the present invention. For example, most of the preferred diamine salts are solid materials at room temperature. However, those in which R' is highly-branched are more readily soluble in water than those having a corresponding linear R'.

There is a wide range of polyamine surfactants useful in the preparation of emulsion compositions of this invention. A polyamine surfactant may be designed especially for use in a given emulsion composition and impart to it very specific physical and chemical properties.

An advantage of using polyamines, especially those in which R' is highly-branched, is the availability of an active liquid formulation which allows the surfactant to be post-added to the emulsion composition without extensive mixing, immediately before application, if necessary. As a result, pre-dispersion, pH-adjustment, de-encapsulation, and related costly and time-consuming techniques of the prior art are avoided altogether. Certain of the preferred diamine diacetates (R'=10–13 carbon atoms) are available from Exxon Chemical Americas of Milton, Wis., and identified as DA-14 Diacetate through DA-17 Diacetate. As stated above, decoxypropylaminopropylamine diacetate (R'=10 carbon atoms) is most preferred (DA-14 Diacetate).

The amount of surfactant effective in providing desirable emulsion qualities, including gel stability, is significantly less than that required of other thickeners of the prior art. Typically, the amount of a polyamine or salt thereof in a composition of this invention (0.10–3.20 parts by weight) is on the order of ten times less than the that of thickeners used in compositions of the prior art. Polyamines and their salts have been found to be so effective that in many emulsion formulations a 40% aqueous solution of the surfactant provides the desired gel characteristics.

As noted, the polyamines and their salts, including the most preferred decoxypropylaminopropylamine diacetate, are useable as liquids at room temperature. Therefore, the composition and method of this invention provide a substantial advantage over the prior art in that bitumen emulsion compositions may be blended much more easily. There is no need for separate steps to solubilize a latex or cellulose-type thickener. Likewise, dust problems associated with dry thickeners are also eliminated.

The bituminous emulsions discussed herein are essentially combinations of either asphalt or coal tar with a clay stabilizer in water. The amount of surfactant required and its performance are functions of the quantity of bituminous and clay particles present. The polyamine surfactant may be used at low concentrations even with low levels of bitumen and clay to provide high viscosities. This feature represents a source of cost-savings over cellulose ethers and latexes of the prior art, which because of their mode of function must be used in amounts proportional to the concentration of bitumen and clay.

In preferred embodiments of this invention, the bentonite, ball or kaolin clays used are principally produced and distributed by the Kentucky-Tennessee Clay Company, Evans Clay, the American Colloid Company, and the Floridan Company, among others. These clays are selected, sized, and processed to provide a thick, consistent clay slurry for use in emulsion preparation. When emulsified with bitumen, clays of this type surround the bituminous particles, minimizing the potential for phase separation. Attapulgite clays may also be used in combination with those mentioned above, and are specially-sized and processed gelling clays suitable for thickening coal tar- or asphalt-based emulsions. Attapulgite clays are available through the Engelhard Corporation, Oil Dri Corporation, and the aforementioned Floridan Company.

The coal tar emulsions best used in this invention may be standard coal tar emulsions used to seal coal tar or asphalt pavements or standard coal tar emulsions with fillers such as sand or coal slag added to provide crack-filling and anti-slip properties. The asphalt emulsions used in this invention are those similar to ASTM/D-1227 types, emulsified asphalt used as protective coating for roofing. Coal tar emulsions useable in this invention are those similar to Federal Specification R-P-355E, pitch, coal tar emulsion (coating for bituminous pavements). Examples of suitable asphalt and coal tar emulsions useable with this invention are: Monsey Superseal Coal Tar Emulsion Blacktop Sealer, from Monsey Corporation, Kimberton, Pa.; American Stone Tar Emulsion Rubberized Blacktop Sealer, from American Stone Company, Baltimore, Md.; Proseal Driveseal Coal Tar Pitch Emulsion Type #15p Blacktop Sealer, from Gardner Asphalt Corporation, Tampa, Fla. Suitable asphalt and coal tar emulsions are also available from a number other sources well-known in the art.

The polyamine surfactants used in this invention would not seem appropriate for bituminous emulsion compositions. Bentonite, ball, and kaolin clays are relatively unreactive. It would appear improbable that surfactants of the type disclosed herein impart the desired gel characteristics observed. Furthermore, cellulose thickeners of the prior art work principally in an absorbent mode, thickening the aqueous phase of the emulsion to prevent phase separation. The use of polyamines in clay-stabilized asphalt and coal tar emulsion compositions is contrary to the state of the art, and the excellent gel characteristics obtained were quite unexpected.

While not wanting to be bound by theoretical considerations, it may be that the surfactants used in this invention interact with the bitumen and clay particles in some unexpected fashion to impart favorable gel characteristics to the resulting emulsion compositions. A clay-stabilized emulsion is characterized by a clay component electrostatically attracted to and effectively surrounding a coal tar (bitumen) droplet to prevent agglomeration and settling of the coal tar, thereby stabilizing the bitumen/water emulsion. It is conjectured that through the introduction of the surfactant component of this invention, a double micellular structure is formed around each clay-coal tar droplet. The first micelle is formed through preferential electrostatic attraction of hydrophilic portions of the surfactant toward the exposed clay, with the lipophilic portions thereof directed towards those of additional surfactant molecules, thus forming the second portion of the proposed double micelle.

Again, without adopting any one functional theory, it is suggested the polyamines and their salts, which are less bulky than other similar surfactants due to their linear hydrophilic portions, are more accessible to the reactive sights of the clay particles. Greater accessibility may allow the surfactant of this invention to better disperse both the bitumen and clay particles, providing an excellent gel network, and resulting in thicker viscosity and much less potential for phase separation.

In the emulsion compositions of this invention the ratio of bitumen to clay is at least 1:1. Increasing this relative level of clay produces an emulsion which tends to be flaky and has little or no weather-resistance. The upper end of the relative bitumen concentration is reached at the point where the cured emulsion is too soft for a given application.

Bitumen and colloidal clays are preferably 20-60 parts by weight of a bituminous emulsion, the remainder essentially water. More dilute aqueous emulsions do not adequately prohibit the settling of the bitumen, clay, or whatever fillers may be present. More concentrated aqueous emulsions become too viscous for use with the emulsion compositions of this invention. The highly preferred range of combined bitumen and colloidal clay is 25-55 parts by weight of the bituminous emulsion.

The emulsions of the type discussed herein may include various minor chemical constituents, including but not limited to emulsifiers which function in the bitumen milling process. Such additives serve to aid attrition, only, by reducing bitumen surface tension and allowing the break-up of coal tar or asphalt particles.

While clay and polyamine surfactant provide the primary gel network for linkage to bituminous particles, fillers may also be used. Fillers, as so defined, may be bulking agents which stabilize the composition after application, or fibers which absorb the aqueous phase and provide reinforcing properties. Such fillers are also added for economy, shrinkage control and to impart anti-skid properties to the final coating product. Examples include sand, mica, ground slate, diatomaceous earth, ground limestone, wollastonite, perlite, cellulose fibers, talc, ground coal slag, and polyolefin fibers. Fillers are typically added as needed to provide the desired bulking and gel properties for the emulsion composition.

Such fillers and the emulsions in which they are dispersed and suspended are to be distinguished from crushed stone aggregate and the like used in conjunction with asphalt pavement compositions. Likewise, the clay component of a bituminous emulsion applicable to this invention does not function as an aggregate. As stated more thoroughly above, clay emulsifies the coal tar, thereby stabilizing the aqueous emulsion.

PREPARATION OF THE COMPOSITIONS

A number of factors must be considered when preparing compositions in accordance with this invention. Among these are the relative amounts of bitumen and clay, the types of bitumen and clay, the ratio of bitumen to clay, the presence and type of fillers, the presence of emulsifiers or other chemicals, the exact type of polyamine or salt to be used, the nature of the process equipment available, the order of addition, and mixing times required.

While the processing steps are not critical and considerable variation is possible, certain blending procedures are preferred. Low shear-like paddle and ribbon mixers, as well as high shear equipment, all produce the same excellent results. However achieved, thorough and complete dispersion of the polyamine or its salt throughout the emulsion is essential.

A preferred procedure involves post-adding the surfactant to the desired emulsion and mixing thoroughly. Gelling is initiated almost immediately as the polyamine interacts with the bitumen and clay particles.

Determining the optimum surfactant concentration is critical. The optimum is considered the least amount that provides the desired gel characteristics, including excellent gel stability, and depends primarily on the specific polyamine or salt used. No less important is the composition of the emulsion, taking into consideration the content and type of bitumen and clay, and the presence of any fillers or emulsifier chemicals. An optimum surfactant concentration must be determined for each emulsion composition.

The most straight-forward way to determine the optimum concentration of a particular polyamine or salt thereof is to prepare a series of emulsions having a constant mix of clay and bitumen, varying the surfactant concentrations at 0.1, 0.2, 0.4, 0.8, 1.6, and 3.2 weight percents, and observing the resultant viscosity and gel stability. The concentration may then be varied in smaller increments, within what is considered to be an acceptable range, to fine-tune the desired gel strength. Relative levels of clay and bitumen may also be varied once the surfactant concentration range is narrowed to determine maximum gel strength. Gel characteristics should be monitored at periodic intervals after mixing (such as 24, 48 hours, 1 week, 2 weeks) under conditions of constant temperature and pressure.

It was experimentally determined that the gel strength is proportional, but not directly so, to surfactant concentration. As is often observed, gel strength increased at a rate greater than expected for a direct correlation. For example, doubling the amount of a polyamine or its salt typically more than doubled gel strength, as measured by viscosity and/or consistency. However, within a relevant range, upon reaching a high end concentration, additional surfactant reduced overall gel strength.

Gel characteristics are determined with a standard Brookfield viscometer for liquid shear-susceptible type materials, but may also be determined by other comparable viscosity-measuring instruments. For thicker paste-like emulsions, instruments such as penetrometers should be used.

The procedures for determining gel characteristics will not be discussed, at length, but are well-known to those skilled in the art. The recommended ASTM test procedures are preferred, in particular those outlined by ASTM/D2939, D3320, D1227, and Federal Specification R-P-355E. However, any reliable test procedure will be acceptable, if properly used. Testing and evaluation is highly recommended because it is possible, although unlikely, an unforeseen chemical uncompatibility may exist, in conjunction with any bitumen emulsifier used or if a latex additive is present.

The range of concentrations tested need not be broad, but should preferably be within 0.10–3.20 parts by weight. Once the optimum concentration is established for a particular bitumen emulsion, it may be used with confidence in production of other similar emulsion compositions of this invention.

Large variations in viscosity or gel characteristics over the course of the test period indicate a lack of gel stability, which, in turn, tends to indicate a formulation problem. Steady viscosity is desired, provided the emulsion composition displays the gel strength desired.

End-use determines what degree of gel strength is needed or if fillers are desirable. Higher gel strengths are required to obtain viscosities necessary to suspend filler particles. The choice and amount of fillers added to the emulsion depend, in part, upon whether the composition is to have anti-skid properties, for example, or if the emulsion is designed for crack filling or some similar purpose. Final viscosity and texture of the emulsion will be largely determined by the kind and amount of fillers added.

The preferred decoxypropylaminopropylamine diacetate (DA-14 Diacetate) may be prepared by a variety of methods familiar to those skilled in the art. Using one such synthetic method, Decyl alcohol (Exxal® 10, Exxon Chemical Co., a mixture of branched isomers derived from propylene) was cyanoethylated with acrylonitrile to form the ether nitrile, which was catalytically reduced with hydrogen to give the ether primary amine. Repeated cyanoethylation and catalytic hydrogenation provided the desired diamine, a clear yellow liquid with a combining weight of 144.2 corresponding to an average molecular weight of 288. The diamine (28.2 grams) was mixed with 60 grams of water, before 11.8 grams of glacial acetic acid were added with mixing. The exothermic reaction resulted in a clear fluid solution of the diamine diacetate (DA-14 Diacetate).

Various other polyamine surfactants of the type disclosed herein are prepared analogously.

EXAMPLES OF THE INVENTION

In each of the examples that follow, a coal tar-based coating composition is made using either low- or high-shear blending techniques, mixing the listed constituents, and in particular, adding a polyamine or salt thereof directly to the emulsion. For each example, the formulation is listed and comments regarding each or the resulting composition are given. (The coal tar emulsion listed in each example is a commercial preparation available from one of the suppliers mentioned above. All contain coal tar and colloidal clay in amounts as defined below.)

Definitions

Solids: Coal tar and clays.

ProSeal Coal Tar Pitch Emulsion Blacktop Sealer #15p: In parts by weight, 10.1 parts clay; 16.2 parts coal tar, (26.3 parts solids total), and 73.7 parts water.

American Stone Rubberized Blacktop Sealer: In parts by weight, 11.1 parts clay, 21.3 parts coal tar, (32.4 parts solids total) and 67.6 parts water.

Monsey Superseal Coal Tar Emulsion Blacktop Sealer: In parts by weight, 13.4 parts clay, 24.6 parts coal tar, (38.0 parts solids total), and 62.0 parts water.

Aqueous Solution: A water solution of the indicated surfactant, in terms of percent by weight of the solution.

EXAMPLE 1

| | |
|---|---|
| ProSeal Coal Tar Pitch Emulsion Blacktop Sealer #15p | 99.8 parts |
| DA-14 Diacetate | 0.2 parts |

This composition represents a lower level of surfactant addition. The viscosity was increased by over 200% when compared to the untreated emulsion.

EXAMPLE 2

| | |
|---|---|
| ProSeal Coal Tar Pitch Emulsion Blacktop Sealer #15p | 99.6 parts |
| DA-14 Diacetate | 0.4 parts |

This composition is preferably blended using a low-shear mixing technique, and has been found to provide an excellent permanent asphalt sealer having a relatively low solid level, but yielding a consistency equivalent to one with a much higher solid level. A 500% increase in viscosity was observed over the same composition without DA-14 Diacetate. Application was improved, mixing time was reduced and the cured coating exhibited a richer darker-black color, when compared to the untreated emulsion.

EXAMPLE 3

| | |
|---|---|
| ProSeal Coal Tar Pitch Emulsion Blacktop Sealer #15p. | 99.2 parts |

| | |
|---|---|
| DA-14 Diacetate | 0.4 parts |

This composition exhibits good gel stability, gel strength, and thixotropy, and represents a ready to use, reduced stir-back product, with a much thicker viscosity (greater than 2×) than the composition of Example 2. Tests on this composition showed a viscosity increase of over 1000% compared to the untreated emulsion. Comparing in order the surfactant levels in Example 1 (0.2 parts), Example 2 (0.4 parts), and Example 2 (0.8 parts), viscosity is directly proportional to surfactant levels.

EXAMPLE 4

| | |
|---|---|
| ProSeal Coal Tar Pitch Emulsion Blacktop Sealer #15p | 96.8 parts |
| D-14 Diacetate | 3.2 parts |

This composition represents a yet higher level of surfactant addition. The viscosity was increased by over 1000% when compared to the untreated emulsion.

EXAMPLE 5

| | |
|---|---|
| Monsey Superseal Coal Tar Emulsion Blacktop Sealer | 99.6 parts |
| DA-14 Diacetate | 0.4 parts |

This composition has 40% more solids than the emulsion in Example 2, yet exhibits excellent viscosity, so much so that it is capable of suspending filler particles, if desired. The increase in viscosity is greater than 100% over the coal tar emulsion without DA-14 Diacetate.

EXAMPLE 6

| | |
|---|---|
| American Standard Rubberized Blacktop Sealer | 99.6 parts |
| DA-14 Diacetate | 0.4 parts |

This composition, blended either by a low-shear or a high-shear technique, provides an improved coal tar emulsion sealer with a thick consistency and a dark black cured film coating.

EXAMPLE 7

| | |
|---|---|
| Monsey Superseal Coal Tar Emulsion Blacktop Sealer | 98.4 parts |
| DA-17 Diacetate | 1.6 parts |

This composition illustrates the use of a diamine salt other than the most preferred surfactant, DA-14 Diacetate. Other diamine surfactants with varying alkyl chain length may be utilized with excellent results.

EXAMPLE 8

| | |
|---|---|
| Monsey Superseal Coal Tar Emulsion Blacktop Sealer | 99.1 parts |
| DA-17 Diacetate, 40% aqueous solution | 0.9 parts |

This composition represents use of a less active (diluted) surfactant as compared to that used in Example 6. Even so, a 50-60% increase in viscosity was demonstrated over that of the untreated emulsion.

EXAMPLE 9

| | |
|---|---|
| Proseal Coal Tar Pitch Emulsion Blacktop Sealer #15p | 99.6 parts |
| Coco-Diamine Diacetate, 40% Aqueous Solution | 0.4 parts |

This composition exhibits good gel characteristics and viscosity, and illustrates the use of a higher molecular weight alcohol as a synthetic precursor for the diamine surfactant. The increase in viscosity over that observed for the untreated emulsion was comparable to that shown by the preferred DA-14 Diacetate, used neat in the composition of Example 1.

EXAMPLE 10

| | |
|---|---|
| Proseal Coal Tar Pitch Emulsion Blacktop Sealer #15p | 99.6 parts |
| Coco-Triamine Triacetate, 40% Aqueous Solution | 0.4 part |

This composition represents an emulsion treated with a triamine salt surfactant. The viscosity of the emulsion was increased, greater than 200% over the untreated emulsion. However, the surfactant is a solid at room temperature, presenting mixing and formulation difficulties.

EXAMPLE 11

| | |
|---|---|
| ProSeal Coal Tar Pitch Emulsion Blacktop Sealer #15p | 99.6 parts |
| Cocoamido-Triamine Triacetate, 40% Aqueous Solution with 20% propylene glycol | 0.4 parts |

This composition exhibits good gel characteristics and viscosity, and illustrates the use of an amidoamine triamine triacetate. The increase in viscosity was over 300% greater than that of the untreated emulsion, but not as great as that observed with use of DA-14 Diacetate.

EXAMPLE 12

| | |
|---|---|
| ProSeal Coal Tar Pitch Emulsion Blacktop Sealer #15p | 99.2 parts |
| DA-25 Diaceatate, 40% Aqueous Solution | 0.8 parts |

This composition represents an emulsion treated with a diamine salt surfactant having an alkoxy chain of 21 carbon atoms, and exhibited a viscosity approximately 200% greater than that of the untreated emulsion.

EXAMPLE 13

| | |
|---|---|
| Proseal Coal Tar Pitch Emulsion Blacktop Sealer #15p | 99.2 parts |
| DA-10 Diacetate | 0.8 parts |

This composition exhibits good gel stability, gel strength, and desired thixotropic properties. It is a ready-to-use, reduced stir-back product, with a viscosity somewhat less than that of the composition in Example 1, but twice that of the untreated emulsion.

EXAMPLE 14

| ProSeal: Coal Tar Pitch Emulsion Blacktop Sealer #15p | 99.6 parts |
|---|---|
| PA-5 Acetate | 1.4 parts |

PA-5 Acetate is an alkoxyalkylamine salt surfactant wherein the alkoxy portion is methoxy. This composition exhibited an increased viscosity over that of the untreated emulsion; however, four times as much PA-5 is required to achieve the same increase in viscosity as that shown with DA-14 diacetate.

EXAMPLE 15

| ProSeal Coal Tar Pitch Emulsion Blacktop Sealer #15p | 99.6 parts |
|---|---|
| Tallow-Tetraamine Tetraacetate | 0.4 parts |

This composition represents the use of a tetraamine salt surfactant. The viscosity of the emulsion was increased nearly 300% over that of the untreated emulsion.

EXAMPLE 16

| ProSeal Coal Tar Pitch Emulsions Blacktop Sealer #15p | 99.6 parts |
|---|---|
| Dodecoxypropyl-Pentaamine Pentaacetate | 0.4 parts |

This example represents use of a pentaamine salt surfactant.

EXAMPLE 17

| ProSeal Coal Tar Pitch Emulsions Blacktop Sealer #15p | 99.6 parts |
|---|---|
| DA-14 Acetate | 0.4 parts |

This example represents use of a 50%-neutralized diamine surfactant.

EXAMPLE 18

| ProSeal Coal Tar Pitch Emulsions Blacktop Sealer #15p | 99.6 parts |
|---|---|
| DA-14 | 0.4 Parts |

This example represents use of an unneutralized diamine surfactant.

EXAMPLE 19

| ProSeal Coal Tar Pitch Emulsions Blacktop Sealer #15p | 99.6 parts |
|---|---|
| Decoxypropyl-Triamine Citrate | 0.4 parts |

This example represents use of a triamine surfactant fully-neutralized by one equivalent of a ribasic organic acid.

While the principles of this invention have been described in connection with specific embodiments, it should be understood clearly that these descriptions are made only by way of example and are not intended to limit the scope of the invention. For example, the bituminous emulsions discussed herein are of the type such that clay and bitumen particles comprise the minor or discontinuous phase. However, compositions of this invention may be extended to inverted emulsions, wherein water is the minor or discontinuous phase. Cutback emulsions are also within the realm of this invention; that is to say, wherein the bitumen ingredient is actually a more-workable slurry of bitumen in a suitable organic solvent, which is then emulsified in water. Likewise, cutback emulsions for use in this invention may be of the inverted type.

We claim:

1. In a surface-coating composition including a clay-stabilized bituminous emulsion, said clay present in an amount sufficient to emulsify the bitumen, the improvement comprising:

about 90.0-99.9 parts by weight of an aqueous bituminous emulsion; and about 0.1-10.0 parts by weight of an emulsion-stabilizing surfactant selected from the group consisting of neutral polyamines, partially and fully acid-neutralized polyamine salts, and mixtures thereof having the structural formula $$[R(NH_2R'')_n NH_{n'}]^{+Yz} Y(X^{-z})$$

wherein

R is a lipophile selected from the group consisting of

R'C(O)—, (acyl).
R'—, (alkyl), and
R'OR''—(alkoxyalkyl).

R' is an alkyl chain having 3-26 carbon atoms,

R'' is a hydrocarbon fragment having 2-6 carbon atoms, n is an integer from 0-4, n' is an integer from 2-3, z is an integer from 0-5 corresponding to the degree of surfactant neutralization and positive charge, X is an anion selected from the group consisting of fully- or partially-unprotonated mono- or polyacid acids, and Y is an integer from 0-5 corresponding to the number of anions having a negative z charge, such surfactant present in an amount sufficient to provide stable gel structure, such that the bitumen and emulsifying clay are maintained in stable and homogeneous emulsion through application.

2. The composition of claim 1 wherein the lipophile is alkoxyalkyl.

3. The composition of claim 2 wherein the alkoxyalkyl lipophile has an R' portion of 3-21 carbon atoms.

4. The composition of claim 3 wherein the alkoxyalkyl lipophile has an R' portion of 10-13 carbon atoms in a branched configuration.

5. The composition of claim 4 wherein the R' portion has 10 carbon atoms.

6. The composition of claim 1 wherein X is the acetate anion.

7. The composition of claim 1 wherein the surfactant is decoxypropylaminopropylamine diacetate.

8. The composition of claim 7 wherein the R' portion has a branched configuration.

9. The composition of claim 1 wherein the bitumen component of the emulsion is selected from the group consisting of coal tar and asphalt.

10. The composition of claim 9 wherein the colloidal clay is selected from the group consisting of bentonite, ball, and kaolin clay.

11. The composition of claim 10 wherein the clay includes attapulgite clay.

12. The composition of claim 9 wherein the ratio of bitumen to clay is at least 1:1.

13. The composition of claim 9 wherein the bituminous emulsion is 20-60 parts by weight bitumen and colloidal clay and 40-80 parts water.

14. The composition of claim 13 wherein the bituminous emulsion is 25-55 parts by weight bitumen and colloidal clay and 45-75 parts water.

15. The composition of claim 14 wherein the surfactant is decoxypropylaminopropylamine diacetate, in which R' has a branched configuration.

16. The composition of claim 14 wherein the surfactant is 0.10-3.20 parts by weight per 100 parts of emulsion.

17. The composition of claim 9 further comprising filler to provide bulk.

18. The composition of claim 1 further comprising filler to provide bulk.

19. In a method for producing a surface-coating composition including a clay-stabilized bituminous emulsion, the improvement comprising:

providing a pre-formed emulsion including water, clay and a bitumen selected from the group consisting of coal tar and asphalt; and as subsequent steps adding to about 90.0-99.9 parts by weight of said pre-formed emulsion and dispersing therein about 0.1-10.0 parts by weight of a surfactant selected from the group consisting of neutral polyamines, partially and fully acid-neutralized polyamine slats, and mixtures thereof having the structural formula

$[R(NH_2R'')_n NH_{n'}]^{+Yz} Y(X^{-z})$ wherein
R is a lipophile selected from the group consisting of R'C(O)—, (acyl),
R'—, (alkyl), and
R'OR"—(alkoxyalkyl), R' is an alkyl chain having 3-26 carbon atoms,
R" is a hydrocarbon fragment having from 2-6 carbon atoms,
n is an integer from 0-4,
n' is an integer from 2-3,
z is an integer from 0-5 corresponding to the degree of surfactant neutralization and positive charge,
X is an anion selected from the group consisting of fully- or partially-unprotonated mono- or polyacids, and
Y is an integer from 0-5 corresponding to the number of anions having a negative z charge, such surfactant present in an amount sufficient to provide stable gel structure, such that the bitumen and emulsifying clay are maintained in stable and homogeneous emulsion through application.

20. The method of claim 19 wherein the lipophile is alkoxyalkyl.

21. The method of claim 20 wherein the alkoxyalkyl lipophile has an R' portion of 3-21 carbon atoms.

22. The method of claim 21 wherein the alkoxyalkyl lipophile has an alkyl chain of 10-13 carbon atoms in a branched configuration.

23. The method of claim 22 wherein the R' portion has 10 carbon atoms.

24. The method of claim 20 wherein the surfactant is 0.10-3.20 parts by weight per 100 parts of emulsion.

25. The method of claim 19 wherein X is the acetate anion.

26. The method of claim 19 wherein the surfactant is decoxypropylaminopropylamine diacetate in which R' has a branched configuration.

* * * * *

UNITED STATES PATENT AND TRADEMARK OFFICE
CERTIFICATE OF CORRECTION

PATENT NO. : 5,224,990

DATED : July 6, 1993

INVENTOR(S) : Stephen Vicenzi and Ken F. Gryzbowski

It is certified that error appears in the above-identified patent and that said Letters Patent is hereby corrected as shown below:

In column 4, line 60, in the formula delete "R+" and insert --R"--.

In column 13, line 3, delete "0.4 parts" and insert --0.8 parts--.

Signed and Sealed this

First Day of March, 1994

Attest:

Attesting Officer

BRUCE LEHMAN

Commissioner of Patents and Trademarks